April 5, 1949.  E. LISOTA  2,466,452
VEHICLE BED ASSEMBLY
Filed April 18, 1947  3 Sheets-Sheet 2
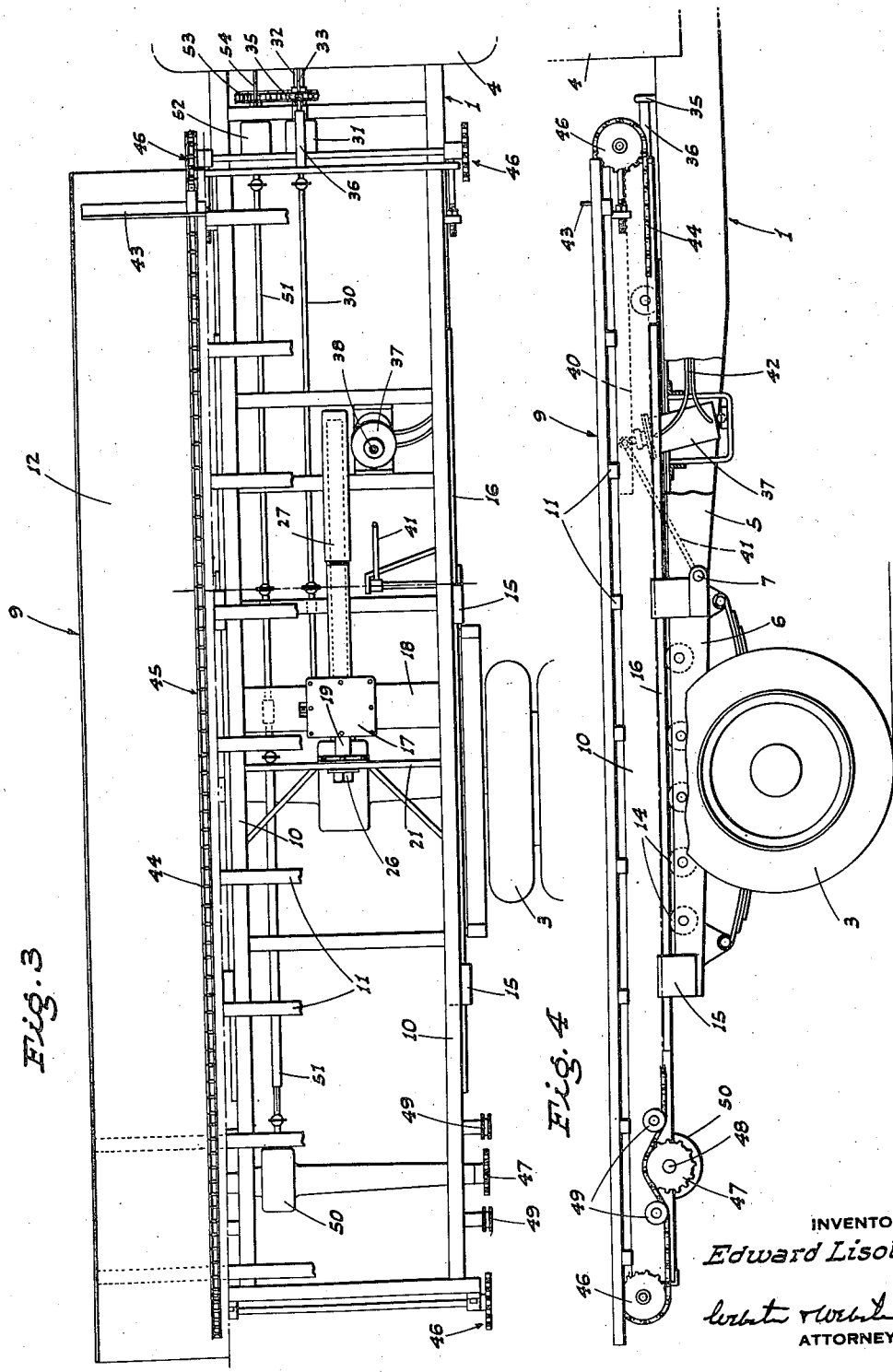
INVENTOR
Edward Lisota
ATTORNEYS April 5, 1949.  E. LISOTA  2,466,452
VEHICLE BED ASSEMBLY
Filed April 18, 1947  3 Sheets-Sheet 3
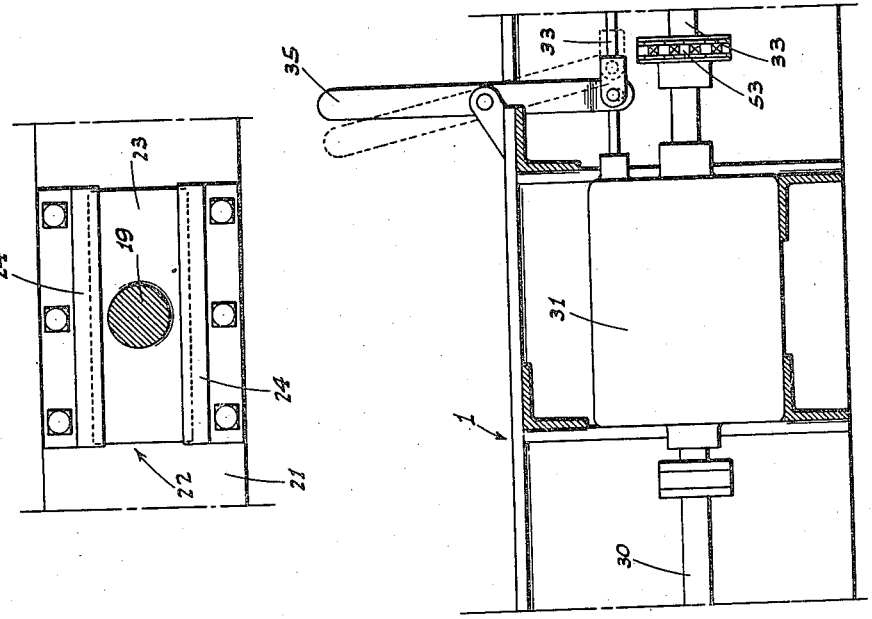
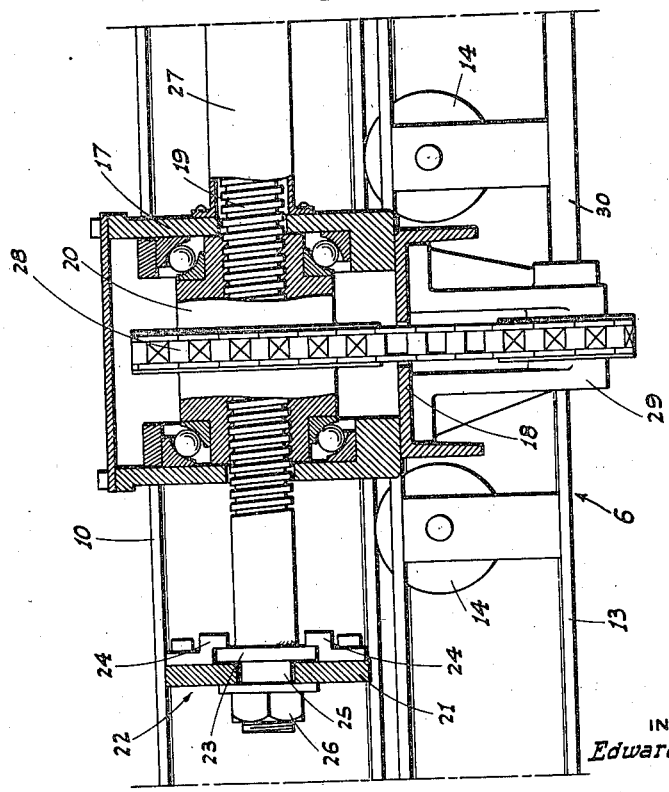
INVENTOR
Edward Lisota
BY
ATTORNEYS Patented Apr. 5, 1949

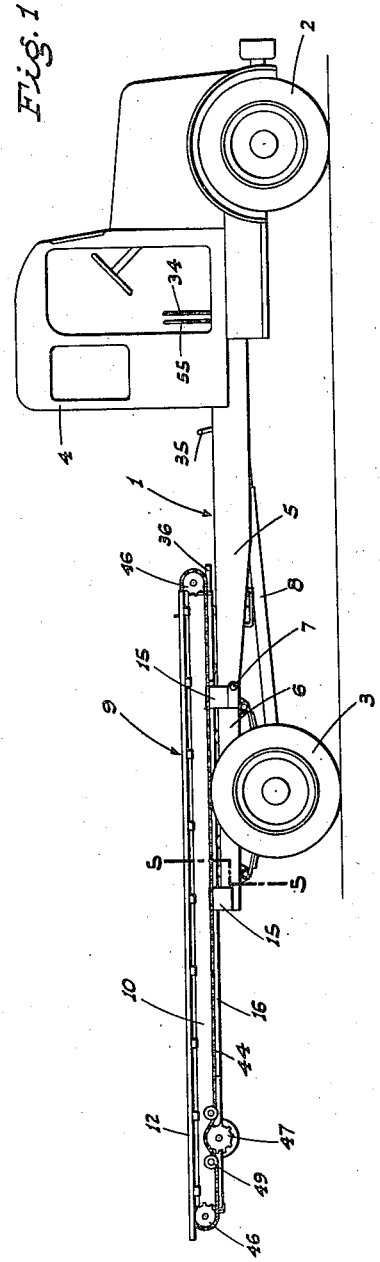
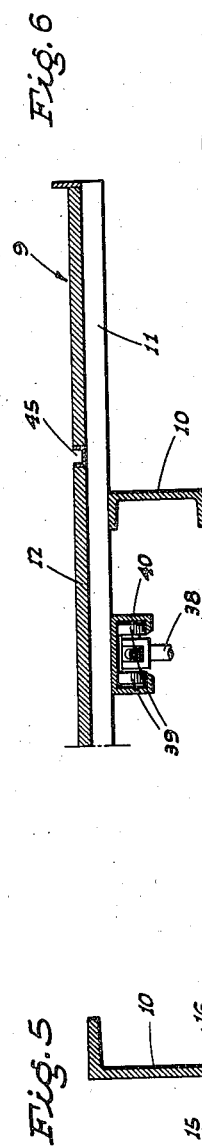
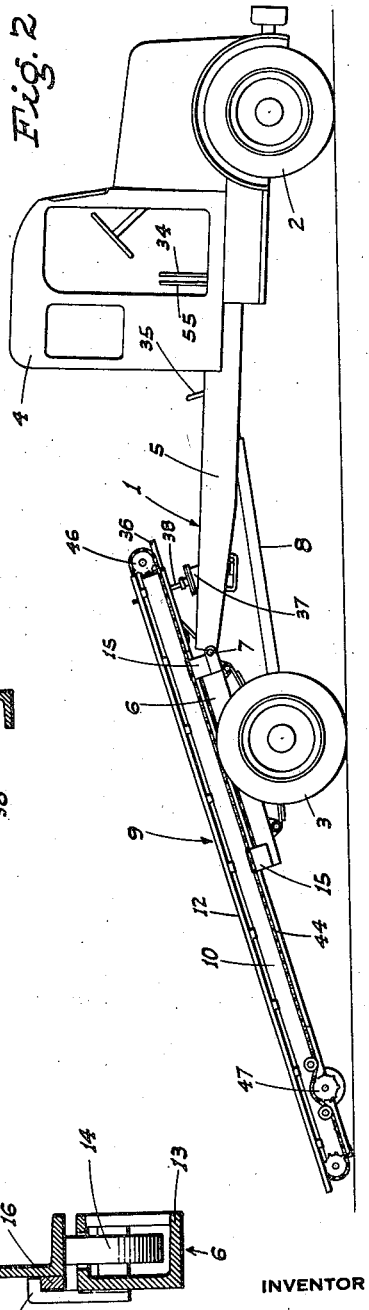

2,466,452

UNITED STATES PATENT OFFICE 2,466,452

VEHICLE BED ASSEMBLY

Edward Lisota, Patterson, Calif.

Application April 18, 1947, Serial No. 742,351

15 Claims. (Cl. 214—85)

This invention is directed to, and it is an object to provide, a vehicle having a novel, movably mounted load carrying bed assembly; the latter being arranged for rearward sliding and downward tilting motion, from normal carrying position, whereby said bed may be inclined into ground engagement for ease of loading and unloading operations.

Another object of the invention is to mount the vehicle bed assembly in relatively slidable connection with one section of an articulated main frame of the vehicle; such articulated main frame being arranged for vertical buckling so as to thus tilt or incline the bed assembly for ground engagement at one end.

A further object of the invention is to provide the bed assembly with a power actuated unloading device, including a transverse pusher bar on the bed coupled to driven endless members associated with said bed.

An additional object of the invention is to provide novel actuating mechanisms operative, selectively and independently, to tilt the bed assembly; to shift or slide the bed assembly longitudinally; and to operate said unloading device.

It is also an object of the instant invention to provide actuating mechanisms, as in the preceding paragraph, wherein the bed assembly tilting mechanism includes a hydraulic ram; the bed assembly sliding mechanism incorporates a novel screw unit; and the unloading device includes sprocket driven endless chains.

A further object of the invention is to provide a practical convenient vehicle bed assembly, and one which will be effective for the purpose for which it is designed.

These objects are accomplished by means of such structure and relative arrangement of parts as will fully appear by a perusal of the following specification and claims.

In the drawings:

Fig. 1 is a side elevation of a truck embodying the present invention; the bed assembly being shown in its rearward position but before downward tilting thereof.

Fig. 2 is a similar view, but shows the main truck frame articulated and the bed assembly tilted downwardly for loading or unloading operations.

Fig. 3 is an enlarged plan view showing the bed assembly fully advanced in its horizontal or load-carrying position.

Fig. 4 is an enlarged side elevation showing the bed assembly in the position of Fig. 3.

Fig. 5 is an enlarged fragmentary cross section on line 5—5 of Fig. 1.

Fig. 6 is an enlarged fragmentary cross section of the bed assembly showing the manner of connection therewith of the piston rod of the hydraulic control ram.

Fig. 7 is an enlarged fragmentary sectional elevation, foreshortened, of the actuating mechanism which effects longitudinal sliding motion of the vehicle bed assembly.

Fig. 8 is an enlarged fragmentary cross section illustrating the loose-play connection between the actuating screw and a cross member of the bed assembly.

Referring now more parricularly to the characters of reference on the drawings, the invention is embodied, in the present instance, in a truck-type vehicle which includes a main frame, indicated generally at 1; front wheels 2; rear wheels 3; and an operator's cab 4.

The main frame 1 of the truck comprises a front section 5 and a rear section 6 articulated, ahead of the rear wheels 3, for vertical buckling motion about a pivot or hinge 7 which connects adjacent ends of said sections 5 and 6. The main drive shaft 8 of the truck is provided with such spline and universal connection means as will permit of the above articulation of the main frame 1 without hindrance. As shown, the rear wheels 3 are spring-mounted in connection with the rear section 6.

A longitudinal vehicle bed asembly, indicated generally at 9, is mounted, intermediate its ends, in connection with the rear section 6 for sliding motion between an advanced, load-carrying position, as in Figs. 3 and 4, to a rearward or retracted position, as in Fig. 1, for downward tilting into ground engagement, upon articulation of the main frame 1, as in Fig. 2, for ease of loading and unloading.

The bed assembly 9 is mounted in connection with the rear section 6 for such motion, as follows:

The bed assembly 9 includes transversely spaced, longitudinal side beams 10 connected at the top at spaced points by cross bars 11 carrying the floor 12 of the bed assembly 9. The longitudinal side beams 10 vertically aline with corresponding side beams 13 of the rear section 6; the side beams 13 carrying a multiplicity of rollers 14 on which the side beams 10 of the bed assembly 9 rest. At opposite ends the side beams 13 carry flanged hold-down fingers 15 which cooperatively engage with longitudinal shoulders 16 on the outside of the longitudinal side beams 10 of the bed assembly 9. In this manner such bed assembly 9 is slidable to and fro relative to the rear section 6.

Such sliding movement of the bed assembly 9 between its advanced, horizontal, load-carrying position, and its rearward, downwardly tilted position into ground engagement for loading or unloading, is accomplished by the following mechanism:

The rear section 6 of the main frame 1 is fitted, intermediate its ends, with a case 17 which seats on a crossbar 18 and extends upwardly between the side beams 10 of the bed assembly 9. A longitudinal actuating screw 19 extends through the case 17, and is threaded therein through a bearing supported nut 20 within said case. At one exposed end the screw 19 is coupled, in relatively non-rotatable but loose-play relation, with a crossbar 21 of the vehicle bed assembly 9, by means of a connection, indicated generally at 22. This connection 22 is loose-play to prevent against binding of the screw 19 in the nut 20, and said connection comprises a transverse plate 23 fixed on the screw and prevented against separation from the crossbar 21 by top and bottom retention flanges 24. The stem 25 of the screw extends in clearance relation through the crossbar; and a nut and washer unit 26 is threaded thereon on the side opposite the plate 23. This arrangement permits the screw 19 to have slight loose play relative to the crossbar 21, and sufficient to prevent any binding of the screw 19 in nut 20.

On the opposite side of the case the projecting portion of the screw is protected within a telescopic hood 27.

The nut 20 is power-actuated, to run the screw 20 in one direction or the other, by an endless chain and sprocket unit 28, whose lower sprocket is carried in a hanger 29 below the case 17; such lower sprocket being driven by a universal drive shaft 30 from a reduction and reversing gear box 31 on the front section 5 of the main frame 1. This reduction and reversing gear box 31 is driven from the power take-off shaft 32 of the truck.

A control rod 33 leads from the reduction and reversing gear box 31 forwardly to a control lever 34 in the operator's cab. By means of this lever, which has a neutral and two-working positions, the operator of the truck can cause actuation of the gear box 31 in one direction or the other, and corresponding motion of the screw 19.

When the screw 19 is run in a direction to cause its rearward projection, the bed assembly 9 is slid rearwardly on the rear section 6 from its advanced load-carrying position to its rearward position preparatory to tilting into ground engagement.

In order to prevent accidental advance of the bed assembly 9 beyond its normal forward limit of movement, an upstanding lever 35 is interposed in connection with the rod 33 directly ahead of the gear box 31; the bed assembly 9 having a trigger member 36 on its forward end in position to engage the lever 35.

When the rod 33 is set to cause operation of the screw 19 in a forward direction, the lever 35 inclines rearwardly, as shown in dotted lines in Fig. 7. When the bed assembly 9 reaches its normal limit of advance, the trigger 36 engages lever 35 and pushes it forwardly to neutral position, stopping operation of the gear box 31 and the connected mechanisms, whereupon the bed assembly 9 is likewise stopped.

The bed assembly 9 is adapted to be downwardly tilted, when in its rearmost position, by means of a hydraulic ram 37 mounted in the front section 5 of the main frame 1; such ram including an upwardly projecting piston rod 38 having a roller unit 39 on its upper end running, in non-separable relation, in a channel track 40 on the bottom of the bed assembly 9. There is a suitable stay rod 41 pivotally connected with the piston rod 38 to maintain its proper position, which is at a slight upward and rearward slope. By reason of the described arrangement of roller unit 39 and channel track 40 the bed assembly may slide to and fro relative to the hydraulic ram 37; the latter nevertheless being effective, at any time, to tilt said bed assembly.

When the bed assembly is in its retracted or rearmost position, the hydraulic ram 37, which is of double-acting type, is operated in a direction to project the piston rod 38, causing tilting of said bed assembly rearwardly and downwardly into ground engagement. The hydraulic ram 37 is controlled from the operator's cab by a hydraulic pressure system, shown only in part at 42.

With the bed assembly 9 in its rearmost position, and tilted into ground engagement, it may be easily and readily loaded or unloaded.

To facilitate unloading operations the bed assembly 9 is fitted with a power-actuated unloading device which comprises a transverse load engaging bar 43 which runs on the floor 12 of said bed assembly. The transverse bar 23 is fixed to the upper runs of a pair of endless chains 44 which extend longitudinally of the bed assembly with said upper runs traveling in counter-sunk channels 45 in said floor 12.

The endless chains 44 are carried, at opposite ends, by suitable sprocket units 46, and said chains are simultaneously and selectively reversibly driven by the following arrangement:

A cross shaft 47 is journaled on the bed assembly 9, and at opposite ends carries drive sprockets 48 running in mesh with the lower runs of the chains 44; such mesh being maintained by means of guide rollers 49. Intermediate its ends the cross shaft 47 extends through, and is driven by, a gear box 50; to which drive is imparted by a longitudinally extending, universal drive shaft 51. The drive shaft 51 extends forwardly and couples, at its front end, to a reduction and reversing gear box 52 mounted in the front section 5 of the truck frame 1 alongside the gear box 31, being driven from the power take-off shaft 32 by an endless chain and sprocket unit 53. The reduction and reversing gear box 52 is controlled by a rod 54 leading to a lever 55 in the cab 4. The lever 55 has a neutral and two working positions, one working position causing operation of the chains 44 and load engaging crossbar 43 in one direction, while the other working position causes reverse motion of said parts.

From the foregoing it will be seen that the bed assembly actuating screw 19; the bed tilting, hydraulic ram 37; and the crossbar actuating chains 44 may be caused to function in one direction or the other, selectively and independently by the operator of the truck, as working conditions may require.

To unload the truck at a given destination, the operator first causes the bed assembly 9, with the load thereon, to be shifted to its rearmost position, and then the hydraulic ram 37 is operated to tilt such bed assembly rearwardly and downwardly into ground engagement. Under some load conditions the bed assembly may tilt of itself, under the weight of the load, and in this circumstance the hydraulic ram 37 may be used as a control means to prevent too rapid tilting movement.

It should also be noted that the hydraulic ram 37 may be used to positively maintain the bed assembly in its horizontal transport position.

After the bed assembly 9 is tilted into ground engagement, the described unloading device is actuated, with the load engaging cross bar 43 caused to move rearwardly on the floor 12, pushing the load from the bed assembly 9 onto the ground. It is obvious that the bed assembly 9 may also be unloaded onto an elevated platform, if desired.

Loading of the bed assembly is accomplished merely by a reversal of the above described unloading operations.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A vehicle comprising a wheel supported main frame, a bed assembly extending lengthwise of the main frame, means mounting the bed assembly on the main frame for sliding motion between an advanced horizontal position and a rearward position, and means operative to effect such sliding motion of the bed assembly, said means including a power actuated longitudinal screw and nut unit coupled between the main frame and bed assembly.

2. A vehicle comprising a wheel supported main frame, a bed assembly extending lengthwise of the main frame, means mounting the bed assembly on the main frame for sliding motion between an advanced horizontal position and a rearward position tilting downwardly toward the rear, means operative to effect such sliding motion of the bed assembly and other means operative to control said tilting thereof, said other means including a fluid pressure actuated ram coupled between the main frame and bed assembly, there being a sliding connection between the ram and said bed assembly.

3. A vehicle comprising a wheel supported main frame, a bed assembly extending lengthwise of the main frame, means mounting the bed assembly on the main frame for sliding motion between an advanced horizontal position and a rearward position tilting downwardly toward the rear, means operative to effect such sliding motion of the bed assembly, and other means operative to control said tilting thereof, said bed assembly sliding means including a power actuated longitudinal screw and nut unit coupled between the main frame and bed assembly, and said other means including a fluid pressure actuated ram coupled between the main frame and bed assembly.

4. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, and means operative to reversibly effect such sliding motion of the bed assembly; said means including a driven gear box on the front section, a universal drive shaft extending rearward from the gear box, a longitudinal screw and nut unit connected between the rear section and bed assembly, and driving connections between the universal drive shaft and said screw and nut unit.

5. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, and means operative to reversibly effect such sliding motion of the bed assembly; said means including a driven gear box on the front section, a universal drive shaft extending rearward from the gear box, a longitudinal screw and nut unit connected between the rear section and bed assembly, and driving connections between the universal drive shaft and said screw and nut unit; there being a control lever for the driven gear box upstanding in the path of forward sliding motion of the bed assembly, and means on the bed assembly to engage the lever and move same to a neutral position when said bed assembly reaches a predetermined point of advance.

6. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means inter-connected between the front section of the main frame and said bed assembly and operative to effect rearward and downward tilting of the bed assembly and connected rear section of the main frame.

7. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means inter-connected between the front section of the main frame and said bed assembly and operative to effect rearward and downward tilting of the bed assembly and connected rear section of the main frame; said bed assembly sliding means and tilting means being reversibly, selectively, and independently, operative.

8. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means operative to effect rearward and downward tilting of the bed assembly and connected rear section of the main frame; there being a power actuated unloading device cooperatively associated with the bed assembly.

9. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means operative to effect rearward and downward tilting of the bed assembly and connected rear section of the main frame; there being a power actuated unloading device cooperatively associated with the bed assembly, and said bed assembly sliding means, and tilting means, together with said unloading device, being reversibly, selectively, and independently, operative.

10. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means operative to effect rearward and downward tilting of the bed assembly and connected rear section of the main frame; said bed assembly sliding means comprising a longitudinal screw and nut unit connected between the rear section and bed assembly, a universal drive shaft connected in driving relation to said unit and thence extending forwardly, and a gear box on the front section driving said shaft.

11. A vehicle comprising a wheel supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means operative to effect rearward and downward tilting of the bed assembly and connected rear section of the main frame; said bed tilting means comprising a fluid pressure actuated ram connected between the front section and the bed assembly, there being a sliding connection between said ram and bed assembly to permit of sliding of the latter.

12. A vehicle comprising a main frame supported by front and rear wheels, said frame being articulated between the wheels for upward buckling motion from a normal substantially horizontal transport position, a bed assembly extending lengthwise of the main frame above the same, means mounting the bed assembly on the rear section of the main frame for sliding motion between an advanced horizontal position and a rearward position, means operative to reversibly effect such sliding motion of the bed assembly, and other means interconnected between the front section of the main frame and said bed assembly and operative to effect rearward and downward tilting of the bed assembly and connected rear section of the main frame.

13. A vehicle comprising a wheel supported main frame including a front section and a rear section pivoted together at adjacent ends for relative upward buckling from a substantially horizontally alined transport position, a bed assembly mounted on the rear section for sliding movement lengthwise thereof, and a hydraulic ram pivotally supported at one end on the front section, the bed assembly being pivotally and slidably connected with the other end of said ram.

14. A vehicle comprising a wheel supported main frame including a front section and a rear section pivoted together at adjacent ends for relative upward buckling from a substantially horizontally alined transport position, the rear section comprising upstanding transversely spaced apart side beams, a plurality of longitudinally spaced rollers on each side beam, a bed assembly including transversely spaced apart side beams, each of such latter beams riding on the rollers on one of the side beams of the said rear section, longitudinally disposed shoulders on the outside of each of the beams of the bed assembly, and flanged fingers longitudinally spaced along each of the beams of the rear section and overhanging the shoulder on the adjacent beam of the bed assembly, and means to slide the bed assembly back and forth on said rollers.

15. A vehicle comprising a wheel supported main frame including a front section and a rear section pivoted together at adjacent ends for relative upward buckling from a substantially horizontally alined transport position, the rear section comprising upstanding transversely spaced apart side beams, a plurality of longitudinally spaced rollers on each side beam, a bed assembly including transversely spaced apart side beams, each of such latter beams riding on the rollers on one of the side beams of the said rear section, longitudinally disposed shoulders on the outside of each of the beams of the bed assembly, flanged fingers longitudinally spaced along each of the beams of the rear section and overhanging the shoulder on the adjacent beam of the bed assembly, a power driven nut journaled between and supported on the side beams of the rear section, and a screw fixed in connection with and disposed between the side beams of the bed assembly, said screw being threaded through said nut.

EDWARD LISOTA.

REFERENCES CITED

The following references are of record in the file of this patent:

UNITED STATES PATENTS

| Number | Name | Date |
|---|---|---|
| 1,378,812 | Holmes | May 17, 1921 |
| 1,885,399 | Wren | Nov. 1, 1932 |
| 2,169,661 | Ratcliffe | Aug. 15, 1939 |
| 2,408,862 | Lisota | Oct. 8, 1946 |
| 2,418,726 | Rogers, Jr. | Apr. 8, 1947 |

FOREIGN PATENTS

| Number | Country | Date |
|---|---|---|
| 472,467 | Great Britain | Sept. 23, 1937 |
| 760,730 | France | Dec. 27, 1933 |